Figure 1:
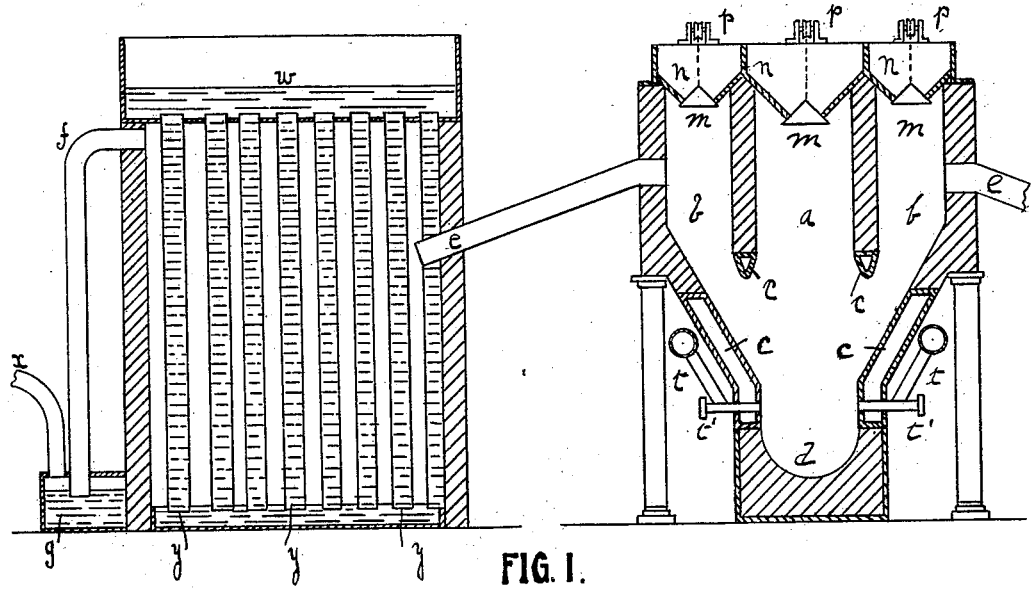

No. 713,043.  
J. ARMSTRONG.  
PROCESS OF SMELTING AND REFINING VOLATILE METALS.  
(Application filed Mar. 24, 1902.)  
Patented Nov. 4, 1902.

(No Model.)

Witnesses  
Inventor  
John Armstrong

UNITED STATES PATENT OFFICE.

JOHN ARMSTRONG, OF LONDON, ENGLAND.

PROCESS OF SMELTING AND REFINING VOLATILE METALS.

SPECIFICATION forming part of Letters Patent No. 713,043, dated November 4, 1902.

Application filed March 24, 1902. Serial No. 99,753. (No specimens.)

*To all whom it may concern:*

Be it known that I, JOHN ARMSTRONG, metallurgist and civil engineer, a subject of the King of Great Britain, residing in London, England, (whose full postal address is 46 Lombard street, London, aforesaid,) have invented certain new and useful Improvements in or Connected with Processes of Smelting and Refining Zinc and other Volatile Metals, of which the following is a specification.

This invention is an improvement on the invention disclosed in my Patent No. 701,458, granted June 3, 1902, whereby the volatile metal is obtained in the form of poussière and either utilized in that form or brought into the solid-metal state by a subsequent process instead of being condensed in a liquid-metal condenser, as described in my former patent.

I find poussière made by my process instead of being a half-oxidized mass like that obtained by the ordinary processes is an unoxidized pulverulent metal very easily brought to the pig-metal state and in its poussière form of great value as a deoxidizer or chemical reagent.

My improved furnace, as far as the reducing portion is concerned, does not differ materially or in principle from that set forth in the former patent except in place of the liquid-metal condenser I conduct the fumes to a surface condenser through suitable flues or tubes.

In this present invention I prefer to divide the process into two separate portions. The first portion can be very well conducted in a similar furnace to that set forth in my former patent with the substitution of the surface condenser, as above described, for the liquid-metal baths or condensers.

The second portion of the process may be conducted in a similar furnace, with the above alterations, or in a pivoted furnace of the type of a Bessemer converter with an independent column of incandescent fuel, as shown in the drawings. In order to make this matter clear, I will describe the process as I have actually carried it out upon ore containing about twenty to twenty-five per cent. of lead and fifteen to twenty-five per cent. zinc and from twelve to twenty-seven ounces of silver per ton. These ores are known as "complex" sulfid ores. I take the ore, grind it to powder, roast it as sweetly as possible to get rid of the sulfur, then mix it with the requisite quantity of iron oxid or iron ore, (this quantity being determined by the amount of zinc and silica in the ore,) together with the fluxes, such as common salt, black ash, carbonate of soda, lime, fluor-spar, oxid of manganese, or other suitable flux. This is mixed together intimately and placed in the furnace in powder, or it may be formed into briquets and placed in the central compartment of the blast-furnace, the fuel being placed in the two side compartments, the object being in the first operation, when ores of this nature are operated upon, to drive the zinc almost entirely into the slag in order that the zinc may be purified and separated from the lead and silver, which are reduced to the metallic state and tapped out in the sump, as in the ordinary process. It is a well-known fact that in all blast-furnace operations a certain amount of lead is volatilized. It is therefore evident that by making this division in the process the fumes volatilized in the first half of the process will contain lead and silver, also a little zinc. These are condensed in the condensers, as shown in the drawings, or any other chamber or suitable condenser that may be attached. The fumes thus obtained are condensed in the metallic form as finely-divided poussière. These are carefully collected from time to time and returned to the furnace with the ordinary charge. The zinc being fluxed, as above stated, into the slag, which is invariably practically free from lead and silver, is treated by the second process or zinc or other volatile ores, together with fluxes, either in the furnace, as described, or in the converter-furnace, already mentioned. The converter-furnace, if used, is heated with fuel to a bright-red heat, and a certain amount of fuel is mixed with the zinc slag or ore, together with lime or common salt, if necessary. The blast is then turned on, the zinc being rapidly volatilized. The converter-mouth is fitted against the column of incandescent fuel, which deoxidizes the metallic zinc vapors and decarbonizes the same by combustion of any free carbon. The zinc vapor is led through the flues or tubes in the condensers, where it is condensed as metallic dust or poussière. This metallic dust or poussière can be either used as poussière or it can be pressed into blocks, with a little carbon, the poussière being so entirely free from oxids that very little carbon is necessary when placed in a retort (such as described in my former patent, No. 701,458) to be quickly reduced to solid metallic zinc.

I have shown a sloping pipe attached to the furnace or column of fuel, which I prefer should be constructed with a water-jacket for the purpose of cooling the vapors. The condenser may be in any suitable form or kind, but must be, together with the tube described, absolutely air-tight. The condensers are preferably constructed with water-jacket cooling-surfaces. I prefer conducting the waste gases when leaving the condensers through a trap containing heavy oil or water. These gases since passing through the column of incandescent fuel are valuable combustible gases and can be used elsewhere, either for heating furnaces, boilers, or driving gas-engines or may be used with advantage for distilling zinc in heating the retorts.

Figure 2:
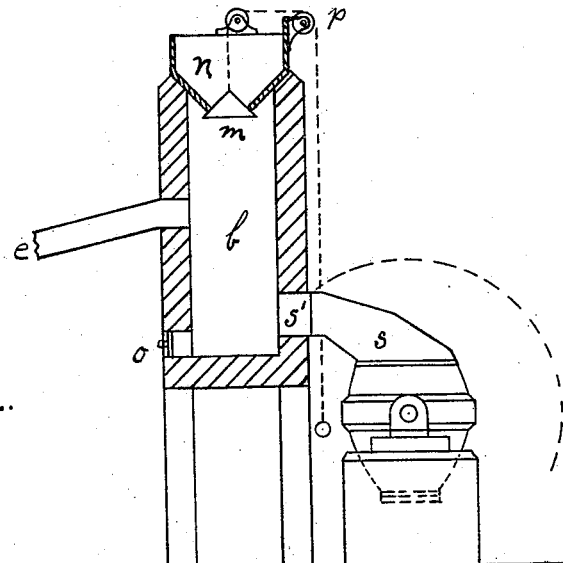

In the accompanying drawings I have shown, in Figure 1, a section of the blast-furnace. Fig. 2 is part elevation and part section of a converter-furnace.

Fig. 1 is a vertical section of a furnace almost identical with that described and shown in my former patent, but with the metallic baths removed and with tubes and condensing-chambers attached, while Fig. 2 is an elevation, partly in section, of a converter-furnace used for this purpose in conjunction with an independent column of incandescent fuel $b\,b$. This latter is more suitable for pure volatile ores. Suitable fluxes can be added with the charge of ore, which is either calcined or used raw, as it seems best for the kind of ore operated upon.

Referring to Fig. 1, $n\,n\,n$ are hoppers in which the charge and fuel are placed. In the central one is placed the charge and coke or fuel in the side ones through the cup and cones $m\,m\,m$. $b\,b$ represent the furnace-chambers to contain columns of incandescent fuel, through which the metallic vapors ascend to the inclined pipes $e\,e$, leading to the condensers. The condensers contain water-tubes $y\,y$, connected at top with a water-tank $w$ and dipping at bottom into a similar tank in which the level of water is kept down by pressure of gas in the closed chamber of the condenser, the metallic dust being deposited on the floor of the condenser. Uncondensed gas passes off at top through an exit-pipe $f$, dipping into liquid, such as heavy petroleum, in the trap $g$, from whence carbon-monoxid gas is carried away through a pipe $x$ to be used elsewhere. The pipes $e$ may be inclosed in ordinary water-jacket coolers and placed at a greater inclination than here shown. $c\,c\,c$ are the water-jackets of the blast-furnace. $t$ is the blast-pipe, and $t'\,t'$ are the twyers. $d$ is the sump for collecting lead or matte.

Fig. 2, $s$ is a converter in which zinc ore or slag or mattes or other volatile ore is mixed with carbon and with or without the fluxes, such as described above. Air is then blown into it, which rapidly volatilizes the metal, which ascends through the column of incandescent fuel $b\,b$ and thence into the tube $e\,e$ to the condensers, as in Fig. 1. The fuel is fed into the column $b\,b$ through the hopper $m$. A door is formed at the base at $o$ for cleaning out clinker, ashes, &c. The converter can be turned around on its pivots for discharging the slag and contents after the operation is finished.

In both constructions if it be found that condensation takes place in the column of fuel or in the upper part of tube $e$ the tube $e$ must be lowered or the heat increased.

In each form of apparatus the process results in depositing the condensed metal in the form of dust or poussière on the floor of the surface condenser, fumes not so condensed being subject to a second condensing operation and the carbon-monoxid gas conducted away for use.

Having now particularly described and ascertained the nature of my said invention and in what manner the same is to be performed, I declare that what I claim is—

1. The herein-described process, which consists in smelting ores containing zinc and like volatile metal and other less volatile metals with fluxes so as to slag the more volatile metals, condensing any fumes in the form of poussière, returning the same to the furnace, drawing off the slag and distilling it with fuel to obtain the zinc and other very volatile metals and tapping out the mixture of lead, silver and other like metals, as described.

2. The herein-described process which consists in smelting ores containing zinc and like volatile metal and other less volatile metals with fluxes to slag the more volatile metals, drawing off the slag; distilling the slag containing zinc and like volatile metals with fuel to obtain the vapors of said zinc and like volatile metals; condensing said fumes in the form of poussière and finally distilling said poussière with a small portion of carbon and condensing in the form of metallic zinc, as set forth.

In witness whereof I have hereunto signed my name, this 14th day of March, 1902, in the presence of two subscribing witnesses.

JOHN ARMSTRONG.

Witnesses:
JOSEPH PHILLIP CRAWLEY,
FRANK DUCK.